Aug. 12, 1969  R. I. JUDD  3,460,791
FAIL SAFE SEAT SUPPORT FRAME
Filed Feb. 8, 1967
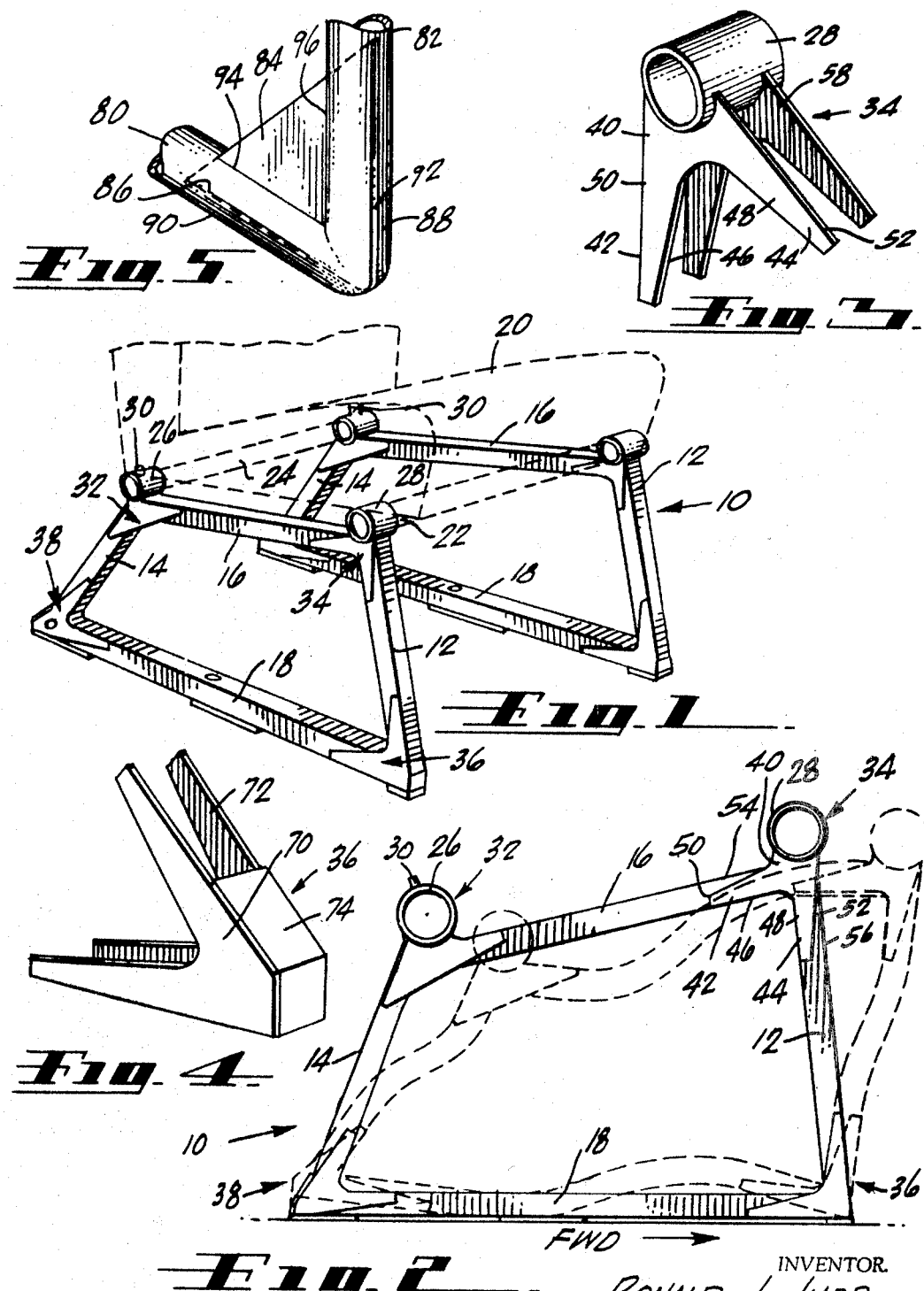
INVENTOR.
RONALD I. JUDD
BY Robert O. Richardson
ATTORNEY

United States Patent Office 3,460,791
Patented Aug. 12, 1969

3,460,791
FAIL SAFE SEAT SUPPORT FRAME
Ronald I. Judd, Anaheim, Calif., assignor to McDonnell Douglas Corporation, Santa Monica, Calif., a corporation of Maryland
Filed Feb. 8, 1967, Ser. No. 614,675
Int. Cl. F16m 11/00
U.S. Cl. 248—188.91               4 Claims

ABSTRACT OF THE DISCLOSURE

A seat support frame is provided with yieldable and non-rigid legs which absorb energy as they deform under high deceleration. The frame is of open truss design with corner gussets protecting each corner up to the same crippling stress. The gussets distribute and control the leg deflections beyond the load carrying capability of the attachments of the frame to the floor. Failure of welds in tension is eliminated while the frame members deflect into an S-shaped curve.

Background of the invention

In recent years there has been a trend toward greater safety in commercial vehicle seat design, and particularly in aircraft. Conventional aircraft passenger seats have legs of welded steel tubing with a diagonal member either in tension or in compression when subjected to high deceleration of the aircraft, such as upon impact. The truss arrangement formed in this manner was very rigid and unyielding. When the legs failed, they failed in or near an interconnecting weld, and at other times they failed along the diagonal member. In either case, the failure is abrupt, catastrophic, and frequently fragments of tubing remained, like spears, upon which passengers could impale themselves.

Heretofore such failure could be avoided only by making the frames of bigger and heavier tubing. This increase in weight increases airline maintenance and operation costs. In an effort to reduce weight, sheet metal aluminum legs have replaced tubular steel legs, and, upon impact, they fail progressively and deform without tearing loose. However, in situations wherein the seats are subjected to an abnormal amount of abuse and rough handling, such as in convertible and military aircraft, and when seats with folding legs are desired, tubular steel legs are preferable to formed aluminum legs.

Summary of the invention

In accordance with the present invention, seat support frames are made with an open truss design. The legs are of steel tubing which yield and are non-rigid. This flexibility controls the crippling stress upon impact and permits deformation without failure of welding which, in this invention, is subjected to shear instead of tension forces. Gussets are provided in the corners which are high on the compression side to cause the frame members to deform into an S-shaped curve while absorbing impact energy.

Brief description of the drawing

FIGURE 1 is a perspective view of a seat frame with the seat shown in dashed lines;

FIG. 2 is a side view of the seat frame with its position shown in dashed lines after it has been subjected to high deceleration stress;

FIG. 3 is a perspective view of one of the upper gusset brackets;

FIG. 4 is a perspective of one of the lower gusset brackets; and

FIG. 5 is a perspective view of the lower front connection of a cylindrical tube frame.

Description of illustrated embodiment

Referring now to FIG. 1 there is shown a pair of open truss frames 10, each consisting of a front leg 12, rear leg 14, top supports 16, and bottom supports 18. These frames are positioned in parallel relationship at the sides of the seat 20 which is mounted thereon by front and rear tubular connecting rods 22, 24, shown in dashed lines. These connecting rods 22 and 24 fit within cylindrical receptacles 26 and 28 which are mounted to the frames. Seat belt connecting fittings 30 are preferably mounted on the receptacles 26, although seat belt fittings may also be attached to the connecting rod 24. The legs and supports preferably are of square tubular steel with square ⅞" on the side and having a wall thickness of .035 inch. As compared to seat frames having conventional one-inch squares with a .065 inch wall thickness, these frames are approximately three pounds lighter per seat. The legs 12, 14, upper support 16 and lower support 18 in each of the frames 10 are interconnected and held together by gusset assemblies 32, 34, 36 and 38. These gusset assemblies each consist of outer plates and inner plates which are welded to the inner and outer faces of the legs and supports. In this manner, upon sudden impact, their welded connections to the legs and supports are subjected to shear forces and not to tension forces. Their configuration is such that the compression portion of the steel frames are reinforced for strength and rigidity while at the same time permitting the tension portions of the frames to bend in a manner to be described in greater detail with reference to FIG. 2.

In the side view of FIG. 2 the seat frame 10 is shown with the front leg 12 extending to a height greater than that of the rear leg 14. The leg 12 extends upwardly and rearwardly from its lower end which is secured by gusset assembly 36 to the front end of lower support 18. Rear leg 14 is mounted to the rear end of bottom support 18 by gusset assembly 38 and this leg 14 extends upwardly and forwardly to be connected to the rear end of top support 16 through gusset assembly 32. Top support 16 thus tilts rearwardly to provide greater seating comfort by an occupant of the chair 20 which is to be mounted thereon.

Upon sudden impact, the occupant will tend to be thrown forwardly, creating a forward force on receptacles 26 through the occupant's seat belt connection 30. Because of the relative lengths of front leg 12 and back leg 14 and top support 16, this force will tend to cause the top part of the leg 12 to move forwardly and rotate around its lower end positioned on the floor. This forward force is opposed by leg 14 and top support 16 which tend to straighten and become the hypotenuse of a triangle formed with bottom support 18 and front leg 12, as the sides thereof. Thus, instead of a rigid brace between gusset assembly 34 and gusset assembly 38 at a straight diagonal, this function is performed by leg 14 and top support 16 which are yieldable and bend to approximate the diagonal brace, to thus limit the forward movement of the top portion of leg 12. Gusset assembly 36 also resists the tendency of the acute angle between leg 12 and support 18 from becoming larger upon impact. In this manner, instead of being a structure that must retain itself rigidly against the impact force or break, this frame will absorb the tremendous impact energy during the small amount of yielding that occurs.

Seat frame 10 thus is reinforced at points subject to compression forces upon impact with gusset plates that are welded in such manner that the welds are subjected to shearing forces, not tension forces. Also, that portion of the frame that is subjected to tension is not reinforced and the tension forces are permitted to cause the legs and supports to yield, as shown by their S configuration. For example, gusset assembly 34 has an outer plate 40 having tapered legs 42, 44. These legs at their inner edges 46, 48 are in alignment with the inner edges of top support 16 and front leg 12. Since these legs are tapered, their other edges 50, 52 are spaced from the outer edges 54 and 56 of top support 16 and front leg 12. Gusset assembly 34 has a corresponding inner plate 58 having legs identical in shape to those just described which are welded to the inner surfaces of the top support 16 and front leg 12. It can be seen from the dotted lines, which show the position of the chair frame after impact, that the inner surfaces of the frame adjacent legs 42 and 44 of the gusset assembly are under compression whereas the outer surfaces 56, 58 of the frame are under tension. Those parts of the frame under compression are reinforced and are made rigid whereas those parts under tension are permitted to yield.

The frame angle of which gusset assembly 34 is the apex may be an acute or a right angle whereas the angles having gusset assemblies 36 and 38 at the apex are acute and the angle having assembly 32 at the apex is obtuse. The configurations of the other gusset assemblies 32, 36 and 38 differ somewhat from that of gusset assembly 34 to accommodate the different angles formed between the legs and the supports. However, the principle remains the same. The legs of the gusset assemblies are welded with their edges in abutment with the edges of the seat frame legs and supports which will be placed under compression upon impact and are tapered in such manner as to permit the opposite surfaces, which are subjected to tension, to yield. The welded surfaces are placed in shear, not tension, upon impact.

As previously mentioned, upon sudden impact, the upper portion of front leg 12 tends to move forwardly and pivot around its lower connection with base support 18, namely about gusset assembly 36. In so doing, the rear leg 14 and top support 16 tend to approach the hypotenuse of a triangle and this action is resisted by gusset assembly 32 and gusset assembly 38, with the compression surfaces held in place with the gusset plates, and the tension surfaces free to yield and elongate. This causes the legs and supports of the chair frame to be bent into an S-shaped configuration, as shown. The front leg 12 and base support 18 also tend to conform to an S-shaped configuration. This yielding tendency absorbs the tremendous impact energy to which the frame is subjected. Since the gussets are welded with the frame legs and supports in a manner to subject the welds to shear stresses, not tension, the frame support and legs do not become disassociated or fail as a result of the impact.

The fail safe seat frame just described is made with inner and outer plates welded at the junctions of the seat supports and legs. If desired, these plates may be made into gusset assesmblies before installation. For example, in FIG. 3, the gusset assembly 28 comprises the outer plate 40 and inner plate 54 spaced in an amount to contain front leg 12 and top support 16 therebetween.

These plates are welded to the seat connector 36 to form a single integral unit, as shown. Gusset assemblies 32 in FIGS. 1 and 2 may be formed in a similar manner. The lower gusset assemblies, such as front assembly 36, may be constructed as in FIG. 4 as a single integral unit for welding to the base support 18 and front leg 12. Here the outer face plate 70 and inner face plate 72 are spaced and connected by a cover plate 74, as shown. Gusset assembly 38 interconnecting rear leg 14 and base support 18 can be fabricated in a similar manner, if desired.

While in the construction of frames of square tubular steel the gusset plates have been shown and described as being welded to the sides of the tubes, this also may be done when cylindrical tubing is used. However, as shown in FIG. 5, a single plate may be used. This plate passes through the diameter of the tubes and is welded along the intersection thereof. The connection shown is the lower front connection between the forward end of base support 80 and the lower end of front leg 82. On sudden deceleration the tendency is for the angle formed thereby to widen, and by maintaining the apex of the angle rigid, the legs 80 and 82 will deform into the S configuration, as previously explained. This is accomplished by placing triangular shaped gusset plate 84 within slots 86, 88 of tubes 80, 82 and welding the intersections thereof. Since the apex of the acute angles of plate 84 abut the outer surfaces 90, 92 of the tubes, which will thus be subjected to compression, and the inner intersections 94, 96 are of lesser length, the tension portion of the tubes 80, 82 are not reinforced by the plate 84 against bending.

The use of one gusset plate at the corner of square tubing frames may also be used in the same manner, if desired. Accordingly, it is to be understood that the term "gusset assembly" may mean one plate through the middle of the connecting tubes, a pair of plates abutting the sides thereof, or a bracket having spaced side plates for attachment to the tubes.

In some applications the bottom support 18 may not be used and the lower gusset plates are adapted for fastening to the floor or base upon which the seat frame is to be mounted. In these applications the resiliency of the bottom support is not utilized.

From the foregoing description, it will become apparent to one skilled in the art that other modifications and variations from the embodiment just described may be used, and it is to be understood that these deviations are to be considered as part of the present invention as defined by the appended claims.

What is claimed is:
1. An open truss fail safe seat frame comprising:
a front leg, a rear leg, and a top support, all connected in nonparallel relationship by gusset assemblies;
means for connecting said legs to a base upon which said frame is to be positioned,
said frame legs, base and support forming angles, the upper rear angle between said top support and said rear leg and the lower front angle between said front leg and said base tending to enlarge and place the inner surfaces of said legs, base and support forming said angles in tension and the outer surfaces in compression, and the upper front angle between said front leg and said top support and the rear lower angle between said rear leg and said base tending to diminish in isze and place the inner surfaces of said legs, base and support forming said angles in compression and the outer surfaces in tension when said frame is subjected to forward moving forces, said gusset assemblies innerconnecting said legs and said support resisting said tendency beyond the bending resistance of said legs, base and support,
said gusset assemblies having legs extending along said frame leg and supports, said gusset assembly leg being tapered whereby they abut the sides of said frame legs and supports along that portion under compression to make that portion rigid and whereby they do not reinforce portions subject to tension and thus permit yield thereof.

2. An open truss fail safe seat frame as in claim 1 wherein:
a bottom support is connected between said legs, said front leg tapering upwardly and rearwardly from its connection with the forward end of said bottom support and said rear leg tapering upwardly and forwardly from its connection to the rear end of said bottom support, said front leg being longer than said rear leg whereby said top support slopes downwardly and rearwardly between the top of said front leg and the top of said rear leg, whereby upon a severe forward force said rear leg and said top support yield to approach the configuration of the hypotenuse of a triangle without causing the angle therebetween to yield.

3. An open truss fail safe seat frame as in claim 1, wherein said gusset assemblies comprise inner face plates and outer face plates spaced apart the thickness of said frame legs and supports to thereby be positioned on the inner and outer sides thereof.

4. An open truss fail safe seat frame as in claim 1, a bottom support being connected between said legs, said gusset assemblies comprising face plates connecting said legs and said supports along the side surfaces thereof, whereby the connection of said face plates to said legs and supports is subjected to shear stresses upon application of forward forces thereto.

References Cited

UNITED STATES PATENTS

| | | | |
|---|---|---|---|
| 734,379 | 7/1903 | Vinson | 248—440 |
| 2,606,727 | 8/1952 | DeHaven | 297—216 XR |
| 2,804,915 | 9/1957 | Bertoia | 297—300 |
| 2,923,542 | 2/1960 | Clark et al. | 248—127 XR |
| 2,933,127 | 4/1960 | Brewster | 297—216 |
| 3,037,812 | 6/1962 | Monroe | 297—355 |
| 3,286,971 | 11/1966 | Walter et al. | 248—429 |
| 3,365,233 | 1/1968 | Uxeda et al. | 297—248 XR |

FRANCIS K. ZUGEL, Primary Examiner

U.S. Cl. X.R.

248—440; 297—216